United States Patent [19]

Watanabe et al.

[11] Patent Number: 4,540,674

[45] Date of Patent: Sep. 10, 1985

[54] SILICON NITRIDE COMPOSITE REFRACTORIES

[75] Inventors: Akira Watanabe, Okayama; Yoshimitsu Takeuchi, Bizen; Noboru Shinoda, Bizen; Tetsusaburo Isono, Bizen; Kenji Fujiwara, Bizen, all of Japan

[73] Assignee: Kyushu Refractories Co., Ltd., Bizen, Japan

[21] Appl. No.: 522,650

[22] Filed: Aug. 11, 1983

[30] Foreign Application Priority Data

Feb. 8, 1983 [JP] Japan .................................. 58-20407

[51] Int. Cl.$^3$ ...................... C04B 35/58; C04B 35/56; C04B 35/04; C04B 35/10
[52] U.S. Cl. ........................................ 501/97; 501/87; 501/88; 501/92; 501/98
[58] Field of Search ...................... 501/87, 88, 92, 97, 501/98

[56] References Cited

U.S. PATENT DOCUMENTS

| | | | |
|---|---|---|---|
| 3,813,252 | 5/1974 | Lipp | 501/97 |
| 3,833,389 | 9/1974 | Komeya et al. | 501/92 |
| 4,377,542 | 3/1983 | Mangels et al. | 501/98 |
| 4,412,008 | 10/1983 | Miyamoto et al. | 501/97 |

*Primary Examiner*—Mark L. Bell
*Attorney, Agent, or Firm*—Wenderoth; Lind & Ponack

[57] ABSTRACT

The present invention relates to silicon nitride composite refractories having silicon nitride bonds therein and having an increased thermal shock-resistance, an improved molten steel-resistance and an improved mechanical strength, which consists of silicon nitride at 20 to 60 wt %, refractory materials at 10 to 50 wt % and boron nitirde at 1 to 30 wt %, or additionally carbon fibers of 0.5 to 10 wt %. The above described characteristics can be realized because the silicon nitride bonds are bonding structures.

7 Claims, No Drawings

SILICON NITRIDE COMPOSITE REFRACTORIES

The present invention relates to silicon nitride composite refractories having silicon nitride bonds therein and showing increased thermal shock-resistance, improved molten steel-resistance and improved mechanical strength.

Recently, silicon nitride has been used for refractories. Silicon nitride refractories obtained by the reaction sintering of silicon are superior in hardness, strength characteristics in cold and hot conditions and further oxidation-resistance.

However, silicon nitride has such a defect that it is inferior in thermal shock-resistance and molten steel-resistance when used as refractories in steel manufacture or ingot manufacture.

In order to improve this defect, the refractories, in which boron nitride, which seems to be able to avoid thermal shock-resistance, is dispersed in silicon nitride, were proposed.

However, boron nitride is broken owing to its small strength and it is impossible to prevent the cracks, which are generated in silicon nitride bonding portions, from extending when boron nitride is subjected to sudden thermal shock.

The inventors found that although silicon nitride refractories must be examined from both the viewpoint of the resistance to the generation of cracks and the resistance to the extension of cracks in order to improve thermal shock-resistance thereof, it is almost impossible to prevent cracks from being generated for every thermal shock, and accordingly thermal shock-resistance can be increased by increasing the resistance to the extension of cracks as well as the resistance to the generation of cracks, so that cracks generated may not be extended to lead the refractory to peel or break off.

In addition, it was found from various kinds of examination that molten steel-resistance can be improved by simultaneously dispersing refractory materials and boron nitride.

It is an object of the present invention to provide silicon nitride composite refractories consisting of silicon nitride, refractory materials and boron nitride, in which silicon nitride bonds are bonding structures.

Since boron nitride, which is used in the present invention, is superior in molten steel-resistance and has comparatively large thermal conductivity and low elasticity, the characteristics of refractories such as molten steel-resistance, heat transfer coefficient, elasticity and the like can be remarkably improved by adding boron nitride to silicon nitride refractories.

The improvement of these characteristics leads to the improvement of the resistance to the generation of cracks, which results in an increase of thermal shock-resistance.

Although we have several kinds of formulae for expressing this resistance to the generation of cracks R, the following formula is used here:

$$R = \sigma \kappa (1-\nu)/(E\alpha),$$

wherein $\sigma$: modulus of rupture; $k$: thermal conductivity; $\nu$: Poisson's ratio; $E$: modulus of elasticity; $\alpha$: thermal expansion coefficient.

The resistance to the generation of cracks, R, of silicon nitride and the mixture consisting of silicon nitride and boron nitride was calculated from the above described formula. The results were shown in Table 1.

$\nu$ of 0.3 was used in the above described formula for the calculation. From the above described formula, the resistance to the generation of cracks is increased with the increase of R. It is found from the Table 1 both the thermal conductivity and the modulus of elasticity can be remarkably improved by dispersing boron nitride into silicon nitride refractories, whereby the resistance to the generation of cracks can be remarkably improved and thus the generation of cracks in the refractories can be prevented to the utmost.

TABLE 1

|  | $Si_3N_4$ 100 | $Si_3N_4$:BN 90:10 | $Si_3N_4$:BN 80:20 |
|---|---|---|---|
| Modulus of rupture at room temperature ($\sigma$: kg/cm$^2$) | 2150 | 1300 | 1000 |
| temperature at 1200° C. ($\sigma$: kg/cm$^2$) | 1920 | 1220 | 900 |
| Thermal conductivity at 1200° C. (k: Kcal/m.hr °C.) | 6.5 | 10.7 | 12.4 |
| Modulus of elasticity at 1200° C. (E: kg/cm$^2$) | 37 × 10$^5$ | 25 × 10$^5$ | 20 × 10$^5$ |
| Thermal expansion coefficient at 1200° C. ($\alpha$: cm/cm. °C. × 10$^{-6}$) | 3.2 | 3.0 | 2.9 |
| Resistance to the generation of crack at 1200° C. (R: Kcal/m.hr) | 737 | 1218 | 1346 |

Although the resistance to the generation of cracks can be remarkably improved by dispersing boron nitride into silicon nitride refractories, it is impossible to completely prevent cracks from being generated under any conditions. Accordingly, it is necessary to prevent once generated cracks from extending. To this end, according to the present invention, refractory materials are also dispersed. The use of refractory materials can give the following effects:

(1) The stress, induced around the particles of refractory materials owing to the difference of said particles of refractory materials from the matrix (silicon nitride in this case) in thermal properties, elastic properties and the like, generate very minute cracks around said particles. When the pointed ends of main cracks, which were generated in the matrix, extend to the range of minute cracks, fracture energy is absorbed, whereby the extension of said main cracks is prevented and as a result toughness is improved.

(2) When the pointed ends of said main cracks extend to the particles of refractory materials, the linear tension is increased, whereby fracture energy is increased and the surface of said particles is fractured. As a result, fracture energy is consumed and the extension of said main cracks is prevented.

(3) It seems that the stress is concentrated on the pointed ends of said main cracks and the generated stress is nearly the fracture strength of the refractory materials.

The plastic deformation range is frequently observed at the pointed ends of cracks. When said main cracks pass through the particles of refractory materials, the fracture energy is absorbed owing to the dislocation (plastic deformation) of said particles of refractory materials, whereby the pointed ends of cracks become dull and as a result the extension of cracks is prevented. MgO, Al$_2$O$_3$ and the like are preferably used as the dispersing particles since they are relatively easy to dislocate.

That is to say, when the cracks extend to the particles of refractory materials dispersed in silicon nitride refractories, the fracture energy is dispersed or absorbed by said particles of refractory materials or absorbed owing to the destruction of the surface of said particles of refractory materials. As a result, the extension of the cracks can be prevented at said particles of refractory materials.

As described above, according to the present invention, boron nitride and refractory materials are dispersed into reaction sintered silicon nitride to obtain silicon nitride composite refractories in order to increase the thermal shock resistance thereof, that is to say, the resistance to the generation of cracks and the resistance to the extension of cracks, whereby not only the thermal shock-resistance but also the molten steel-resistance can be remarkably improved.

Silicon nitride, which is used in the present invention, is obtained by the reaction sintering of silicon. Minute particles of silicon powder having grain sizes of 100 microns or less, are preferably used not only in respect of the reactivity thereof with nitrogen but also in respect of the formation of the strong and homogeneous silicon nitride bonding structures owing to the improvement of silicon itself in the dispersivity.

Silicon nitride is preferably used in a ratio of 20 to 60 wt%. If it is used in a ratio smaller than 20 wt%, the resulting silicon nitride composite refractories are inferior in the bonding strength while if it is used in a ratio larger than 60 wt%, the resulting silicon nitride composite refractories are inferior in thermal shock-resistance.

For said refractory materials oxides such as magnesia, spinel, alumina and zirconia, and carbides such as SiC and $B_4C$ are used in the form of powders having the grain sizes of 50 microns or more. If their grain sizes are smaller than 50 microns, the extension of cracks can not be prevented.

However, also those having the grain sizes smaller than 50 microns can be used in order to adjust particle sizes of the composite.

Said refractory materials are preferably used at a ratio of 10 to 50 wt% since if they are used at a ratio smaller than 10 wt%, the resulting silicon nitride composite refractories are inferior in the resistance to the extension of cracks while even though they are used at a ratio larger than 50 wt%, the resistance to the extension of cracks can not be so improved for the amount of said refractory materials.

Boron nitride containing BN purity of 98 wt% or more and having the grain sizes of 5 microns or less is preferably used. The use of minute particles of boron nitride having the grain sizes of 5 microns or less leads to the improved dispersion of boron nitride in composite refractories and the superior molten steel-resistance of boron nitride as well as its characteristics of low wettability to steel are exhibited.

Said boron nitride is preferably used in a ratio of 1 to 30 wt% since if it is used in a ratio smaller than 1 wt%, the resulting silicon nitride composite refractories are inferior in the resistance to the generation of cracks and molten steel-resistance while if it is used in a ratio larger than 30 wt%, the strength of the resulting silicon nitride composite refractories is reduced.

An example of a method for manufacturing silicon nitride composite refractories according to the present invention will be described below. The mixture consisting of silicon, refractory materials and boron nitride is sufficiently blended in a mixer. Then, the binder such as CMC, PVA, dextrine or phenolic resin is added. The resulting mixture is blended and molded. The molded product is nitrided and calcined at 1300° C. to 1500° C. for 20 to 120 hours in the atmosphere such as nitrogen and ammonia to obtain silicon nitride composite refractories.

A part or all of boron nitride, which is used in the present invention, may be replaced with carbonaceous materials. Carbonaceous materials have the resistance to the generation of cracks and molten steel-resistance similarly to the case of boron nitride.

Said carbonaceous materials include graphite, coke, carbon black and the like. The grain size thereof of 1 mm or less is suitable. If it is larger than 1 mm, the dispersivity is reduced and the resulting silicon nitride composite refractories are inferior in molten steel-resistance.

Said carbonaceous materials are preferably used in a ratio of 1 to 20 wt% since if they are used in a ratio smaller than 1 wt%, the resulting silicon composite refractories are inferior in the resistance to the generation of cracks and molten steel-resistance while if they are used in a ratio larger than 20 wt%, the strength of the resulting silicon nitride composite refractories is reduced.

In addition, the present invention has a defect such that an increase of the amount of boron nitride, carbonaceous materials and refractory materials used leads to the reduction of the mechanical strength of the resulting refractories.

In order to improve this defect, it is preferable to use carbon fibers, which have an increased tensile strength and characteristics almost similar to those of boron nitride, together with boron nitride.

It is found from the microscopic observation that silicon nitride bonds formed by reaction sintering of silicon are characterized by the fact that silicon nitride grains do not exist singly but exists in connection with each other to form a continuous net-like three-dimensional structure. According to the present invention, carbon fibers, which exist in the molded product at random, are taken into the silicon nitride bonded structure by nitriding and calcining the molded product in the process in which said silicon nitride bonded structure is gradually formed, whereby said carbon fibers are fixedly bound in said silicon nitride bonded structure.

These fixedly bound carbon fibers are of use to improve the mechanical strength of the resulting silicon nitride composite refractories.

For said carbon fibers carbonaceous fibers, or graphitic fibers having the mean diameter of 10 to 100 microns and the mean length of 0.2 to 100 mm are preferably used.

If the mean length is less than 0.2 mm, the mechanical strength of the resulting refractories can not be improved while if the mean length is larger than 100 mm, the dispersivity is reduced, whereby the mechanical strength is reduced.

Further, if the mean diameter of said carbon fibers is less than 10 microns, the rate of said carbon fibers broken in the blending process is increased while if it is larger than 100 microns, the mechanical strength of the resulting refractories can not be improved since the number of said carbon fibers is reduced.

Said carbon fibers are preferably used in a ratio of 0.5 to 10 wt% since if they are used in a ratio less than 0.5 wt%, the mechanical strength of the resulting refractories can not be improved while even though they are used in a ratio larger than 10 wt%, the effect is little for the amount of said carbon fibers added.

The resistance to the generation of cracks of refractories in which carbon fibers are added, and refractories, in which boron nitride was replaced with carbonaceous materials, and additionally containing carbon fibers is shown in Table 2.

size of 110×70×30 mm at the pressure of 2000 kg/cm² by means of a vacuum oil press.

As to the materials used in these compositions, silicon having a purity of 98% or more by weight (as Si) and having the grain sizes smaller than 100 microns, refractory materials having the grain sizes of 100 to 3000 microns, boron nitride having a purity of 99% or more by weight (an BN) and having the grain sizes smaller

TABLE 2

|  | $Si_3N_4$ 100 | $Si_3N_4:BN:CF$ 90:5:5 | $Si_3N_4:C$ 90:10 | $Si_3N_4:C$ 80:20 | $Si_3N_4:C:CF$ 90:5:5 |
|---|---|---|---|---|---|
| Modulus of rupture at room temperature ($\sigma$: kg/cm²) | 2150 | 2100 | 1290 | 980 | 1900 |
| temperature at 1200° C. ($\sigma$: kg/cm²) | 1920 | 1900 | 1200 | 865 | 1850 |
| Thermal conductivity at 1200° C. (k: Kcal/m.hr °C.) | 6.5 | 13.6 | 10.5 | 12.3 | 13.0 |
| Modulus of elasticity at 1200° C. (E; kg/cm²) | $37 \times 10^5$ | $7.8 \times 10^5$ | $25.5 \times 10^5$ | $19 \times 10^5$ | $8 \times 10^5$ |
| Thermal expansion coefficient at 1200° C. ($\alpha$: cm/cm. °C. $\times 10^{-6}$) | 3.2 | 2.95 | 3.0 | 2.95 | 3.0 |
| Resistance to the generation of crack at 1200° C. (R: Kcal/m.hr) | 737 | 7864 | 1153 | 1329 | 7014 |

Thus, silicon nitride composite refractories according to the present invention can be used as refractories of refining furnaces of various kinds of metal and molten metal vessels, refractories for various kinds of continuous casting, protecting tubes and engineering ceramics.

The preferred embodiments of the present invention will be described below.

EXAMPLES 1 TO 14

To the compositions as shown in Table 3 and Table 4, phenol resin powder is added at a ratio of 1% by weight. The mixture is blended in a Henschel's mixer and then ethylene glycol is added to the resulting mixture at a ratio of 3 to 5% by weight. The mixture is blended. Then, the resulting mixture is molded to the than 5 microns, graphite containing fixed carbon at a ratio of 90% or more by weight and having the grain sizes less than 1 mm, and carbon fibers having the mean diameter of 14 microns and the mean length of 50 mm were used.

The molded product was held in the atmosphere of nitrogen finally at 1400° C. for 72 hours to obtain the refractories.

In comparative examples, refractories were also obtained in the same manner as in examples.

The test results for refractories obtained in examples were shown in Table 3 and Table 4 in comparison with those for refractories obtained in comparative examples.

TABLE 3

|  | Example | | | | | | | Comparative example |
|---|---|---|---|---|---|---|---|---|
|  | 1 | 2 | 3 | 4 | 5 | 6 | 7 |  |
| Composition (wt %) | | | | | | | | |
| Silicon | 37.5 | 37.5 | 37.5 | 37.5 | 37.5 | 37.5 | 37.5 | 70.6 |
| Magnesia | 56.3 | 50.0 | 43.7 |  | 56.3 | 50.0 | 43.7 |  |
| Alumina |  |  |  | 50.0 |  |  |  |  |
| Boron nitride | 6.2 | 12.5 | 18.8 | 12.5 | 3.7 | 6.25 | 6.25 | 29.4 |
| Carbon fiber |  |  |  |  | 2.5 | 6.25 | 12.55 |  |
| Chemical composition (wt %) | | | | | | | | |
| $Si_3N_4$ | 50.0 | 50.0 | 50.0 | 50.0 | 50.0 | 50.0 | 50.0 | 80.0 |
| MgO | 45.0 | 40.0 | 35.0 |  | 45.0 | 40.0 | 35.0 |  |
| $Al_2O_3$ |  |  |  | 40.0 |  |  |  |  |
| BN | 5.0 | 10.0 | 15.0 | 10.0 | 3.0 | 5.0 | 5.0 | 20.0 |
| Carbon fiber |  |  |  |  | 2.0 | 5.0 | 10.0 |  |
| Modulus of rupture at 1200° C. (kg/cm²) | 705 | 600 | 480 | 630 | 1050 | 1350 | 1580 | 900 |
| Thermal shock-resistance Resistance to the generation of cracks at 1200° C. (Kcal/m · hr)*1 | 1762 | 2303 | 2660 | 2057 | 5053 | 9580 | 14851 | 1346 |
| Resistance to the extension of cracks ($\Delta T$ °C.)*2 | 800 | 850 | 900 | 800 | 950 | 1150 | 1300 | 550 |
| Index number of molten steel-resistance*3 | 400 | 480 | 560 | 455 | 490 | 655 | 700 | 100 |

TABLE 4

|  | Example | | | | | | | Comparative example |
|---|---|---|---|---|---|---|---|---|
|  | 8 | 9 | 10 | 11 | 12 | 13 | 14 |  |
| Composition (wt %) | | | | | | | | |
| Silicon | 33.0 | 33.0 | 33.0 | 33.0 | 33.0 | 33.0 | 33.0 | 70.6 |
| Magnesia | 60.9 | 54.8 | 48.7 |  | 60.9 | 54.8 | 48.7 |  |

TABLE 4-continued

|  | Example 8 | Example 9 | Example 10 | Example 11 | Example 12 | Example 13 | Example 14 | Comparative example |
|---|---|---|---|---|---|---|---|---|
| Alumina |  |  |  | 54.8 |  |  |  |  |
| Graphite | 6.1 | 12.2 | 18.3 | 12.2 | 3.6 | 6.1 | 6.1 | (BN)29.4 |
| Carbon fiber |  |  |  |  | 2.5 | 6.1 | 12.2 |  |
| Chemical composition (wt %) |  |  |  |  |  |  |  |  |
| Si$_3$N$_4$ | 45.0 | 45.0 | 45.0 | 45.0 | 45.0 | 45.0 | 45.0 | 80.0 |
| MgO | 50.0 | 45.0 | 40.0 |  | 50.0 | 45.0 | 40.0 |  |
| Al$_2$O$_3$ |  |  |  | 45.0 |  |  |  |  |
| C | 5.0 | 10.0 | 15.0 | 10.0 | 3.0 | 5.0 | 5.0 | (BN)20.0 |
| Carbon fiber |  |  |  |  | 2.0 | 5.0 | 10.0 |  |
| Modulus of rupture at 1200° C. (kg/cm$^2$) | 630 | 550 | 440 | 560 | 950 | 1280 | 1460 | 900 |
| Thermal shock-resistance Resistance to the generation of cracks at 1200° C. (Kcal/m · hr)*1 | 1716 | 2147 | 2335 | 2033 | 4005 | 7665 | 11654 | 1346 |
| Resistance to the extension of cracks (ΔT °C.)*2 | 800 | 850 | 900 | 800 | 950 | 1150 | 1300 | 550 |
| Index number of molten steel-resistance*3 | 410 | 470 | 550 | 450 | 480 | 600 | 670 | 100 |

Note:
*1The resistance to the generation of cracks was calculated from the formula R = σk(1 -ν) (Eα) in which ν of 0.3 was used. The larger R is, the higher the resistance to the generation of cracks is.
*2The resistance to the extension of cracks was indicated by thermal shock value (ΔT °C.). This value is the temperature at which the reduction of modulus of rupture is not found when the sample of 18.3 × 10.5 × 40 mm is held at said temperature for 1 hour to reach the stationary state and then quenched in water (room temperature) followed by drying and being tested on modulus of rupture. The larger ΔT is, the higher the resistance to the extension of cracks.
*3Molten steel-resistance was determined by measuring the amount of melting loss when the sample of 30 × 30 × 30 mm provided with an opening of 10φ × 20 mm, in which a steel bar was put, was heated at 1600° C. in the atmosphere of argon. Molten steel-resistance was indicated by index numbers so that the inverse number of the maximum dimension of melting loss might be expressed by 100 in the comparative example.

As shown in Tables 3 and 4, the examples 1–4 and 8–11 of systems Si$_3$N$_4$—MgO, Al$_2$O$_3$—BN, C have been slightly reduced in hot modulus of rupture compared with the comparative example of system Si$_3$N$_4$—BN, but have remarkably improved in resistance to the generation of cracks, resistance to the extension of cracks and molten steel-resistance, thereby having proved excellence of the present invention.

Also, the examples 5–7, 12–14 of systems Si$_3$N$_4$—MgO—BN, C-carbon fibers have remarkably improved in hot modulus of rupture, resistance to the generation of cracks, resistance to the extension of cracks and molten steel-resistance compared with the comparative example of system Si$_3$N$_4$—BN, thereby having also proved excellence of the present invention.

What is claimed is:

1. Silicon nitride composite refractories consisting of:
   20 to 60 wt% silicon nitride;
   10 to 50 wt% refractory materials in powder form selected from the group consisting of magnesia, spinel, alumina, zirconia and carbides, said refractory materials having grain sizes of 50 microns or more, and
   1 to 30 wt% boron nitride,
   said composite refractories containing silicon nitride bonds formed by the reaction sintering of silicon, said silicon nitride bonds being bonded structures.

2. Silicon nitride composite refractories consisting of:
   20 to 60 wt% silicon nitride;
   10 to 50 wt% refractory materials in powder form selected from the group consisting of magnesia, spinel, alumina, zirconia and carbides, said refractory materials having grain sizes of 50 microns or more, and
   1 to 30 wt% of boron nitride, carbonaceous materials or both, said carbonaceous materials being selected from the group consisting of graphite, coke and carbon black,
   said composite refractories containing silicon nitride bonds formed by the reaction sintering of silicon, said silicon nitride bonds being bonded structures.

3. Silicon nitride composite refractories as set forth in claim 2 wherein said carbonaceous materials have a grain size of 1 mm or less.

4. Silicon nitride composite refractories as set forth in claim 2 which carbonaceous materials contain carbon fibers in an amount of up to 10% by weight based on the composite refractories.

5. Silicon nitride composite refractories as set forth in claim 4 wherein said carbon fibers are present at 0.5 to 10% by weight.

6. Silicon nitride composite refractories as set forth in claim 1 wherein said carbides are selected from the group consisting of SiC and B$_4$C.

7. Silicon nitride composite refractories of claims 1 and 2 wherein the reaction and sintering is performed at 1,300° to 1,500° C.

* * * * *